United States Patent [19]

Yarbrough

[11] Patent Number: 4,495,954
[45] Date of Patent: Jan. 29, 1985

[54] THRESHING CONCAVE FILLER STRIP RETAINER

[75] Inventor: Don L. Yarbrough, Coal Valley, Ill.

[73] Assignee: Deere & Company, Moline, Ill.

[21] Appl. No.: 610,536

[22] Filed: May 15, 1984

[51] Int. Cl.³ .................. A01F 12/18; A01F 12/28
[52] U.S. Cl. ............................ 130/27 K; 130/27 J
[58] Field of Search ............... 130/27 J, 27 K, 27 L

[56] References Cited

U.S. PATENT DOCUMENTS

| 1,165,241 | 12/1915 | Gee | 130/27 K |
| 2,457,680 | 12/1948 | Johnson | 130/27 K |
| 3,537,459 | 11/1970 | Thomas | 130/27 K |
| 3,648,709 | 3/1972 | De Corne | 130/27 JT |

Primary Examiner—Paul J. Hirsch

[57] ABSTRACT

Detachable filler strips for a threshing concave are retained by fastener assemblies which, for installation and securing of the filler strip, require access only to the inside of the concave. Each fastener assembly includes a resilient cylindrical body and a threaded fastener for axially compressing the body. In preparation for installation, fastener assemblies are installed in the filler strips and each tightened sufficiently to hold the resilient body nonrotatably (due to friction) against the filler strip. After installation, with the fastener assemblies extending outwards between the concave rods, further manipulation of the fastener from inside the concave expands the body diameter sufficiently to grip the rods and retain the filler strip in the concave.

5 Claims, 4 Drawing Figures

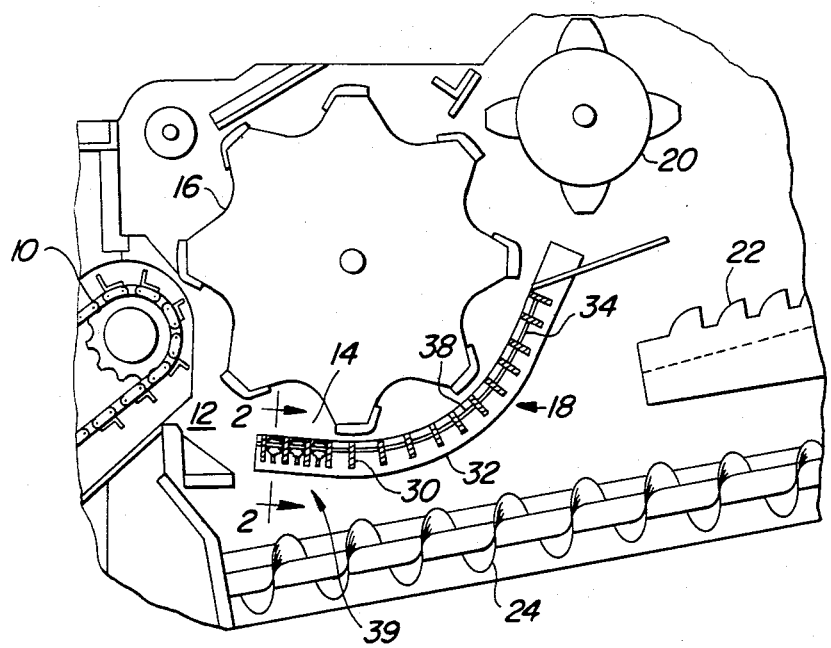
Fig. 1
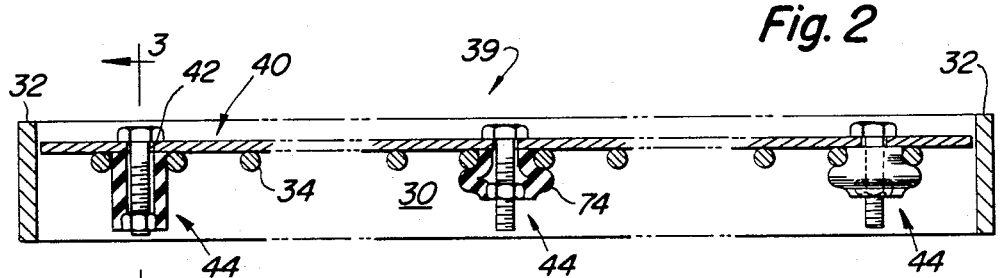
Fig. 2
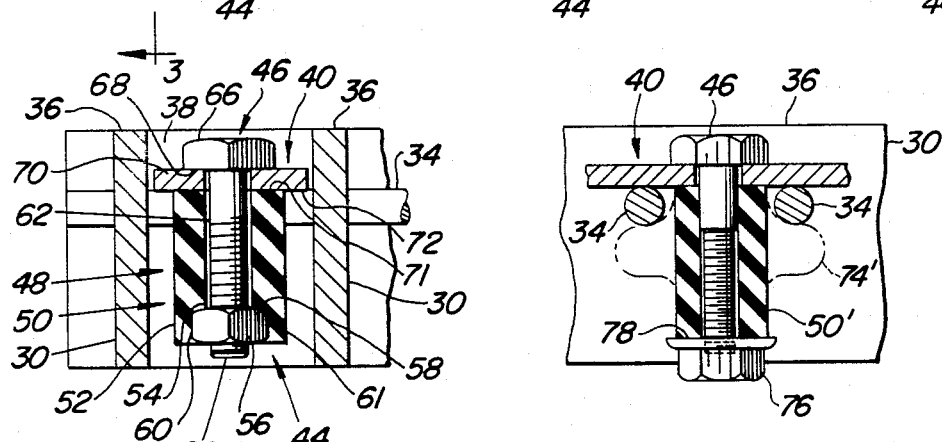
Fig. 3
Fig. 4

THRESHING CONCAVE FILLER STRIP RETAINER

BACKGROUND OF THE INVENTION

The present invention concerns a threshing mechanism in which a threshing cylinder cooperates with an open concave and particularly with means for at least partially closing the concave by the attachment of one or more filler strips.

The typical concave used with a rasp bar threshing cylinder consists essentially of an arcuate grate, roughly concentric with the threshing cylinder. It is made up of spaced bars parallel to the axis of the cylinder and, threaded through the bars, a series of rods extending circumferentially and roughly concentric with the cylinder and inset somewhat below the inner edges of the axial bars. Thus, between each pair of neighboring axial bars, there is a narrow elongated recess extending the length of the cylinder with its fore-and-aft walls defined by the inner edges of the concave bars and a floor defined by the concave rods passing circumferentially through the bars.

In some crops and operations, it is desirable to close or partially close the concave so as to modify its threshing and separating action. This is commonly done by securing filler strips in the recesses, generally using the circumferential concave rods as anchoring means. The basic design of the conventional rasp bar cylinder and threshing concave is very old but patents disclosing means for modifying the concave characteristics, including means for closing or partially closing the concave continue to appear, suggesting that the cylinder/concave system is far from being optimized. Certainly the known methods of concave filler strip attachment have readily recognizable short comings. For example, Lindgren (U.S. Pat. No. 2,159,664) requires the modification of side bars of the concave (adding pins to help retain the filler strip) and relies on a fastening means which requires access from both the inner and outer sides of the concave.

Young (U.S. Pat. No. 2,686,523) relies on spring clips engaging the concave rods for strip retention. Although this method has had some success, it is still possible, in some operating conditions, for the spring clips to lose their grip and for a filler strip and join the downstream material flow, possibly with some damage to combine components.

Morgan's purpose (U.S. Pat. No. 3,092,115) is to provide a resilient surface for the concave but the method is still to provide "filler" strips, anchored between the concave's axial bars. Threaded studs extend from the underside of the filler strips through and between the circumferential concave rods which are spaced closely enough that a nut and flat washer can be used to secure the strips. However, retaining nuts in such locations are generally inaccessible and difficult to keep tight given the typical vibration of the concave during threshing operation.

In an effort to simplify attachment and reduce the risk of loose parts damaging the combine, Baumeister et al (U.S. Pat. No. 3,191,607) propose a compound strip assembly with opposing sets of hooks at its opposite ends, for hooking over the concave rods and being retained by axial elasticity in the filler strip assembly. Installation appears to be simple and convenient but the construction is more costly and results in an uneven filler strip surface and the reliability of retention is doubtful, certainly after extended service life.

Davidow et al (U.S. Pat. No. 3,439,684) also suggest a compound filler strip which is simple and convenient to install but lacks positive anchoring to the concave rods. In assembly, the filler bar is an inverted channel with the channel walls notched to match the concave rod spacing and a magnetic strip attached to the inner floor of the channel. This form of construction results in a certain minimum radial thickness of filler bar which may be greater than desirable in some applications. Certainly the risk of detachment and loss of the filler bar would be increased in concaves where the filler bar projected radially above the concaves axial bars.

SUMMARY OF THE INVENTION

Accordingly, it is an object of the invention to provide a concave filler strip arrangement with improved convenience and security of attachment and with low cost of manufacture while maintaining desirable functional characteristics.

In keeping with these objects, the invention may be realized in filler strip assembly which my be preassembled and placed in position, resting inside the concave on the convace rods and between the axial concave bars, and accessible from the throat between threshing cylinder and concave at the inlet to the threshing zone. Anchoring of the strip to the concave may then be effected conveniently by manipulating fastener elements extending radially outward through the filler strip and between the concave rods and accessible from the threshing zone above or inside the concave. According to the invention, blind fasteners or anchoring means are used requiring access only from the inside of the concave. Preferably, the fasteners include at least one resilient element so that in operation, loosening and loss of tension due to vibration is minimized.

In a preferred embodiment of the invention, a fastener shank passes through the filler strip and the through bore of a resilient member and carries a shoulder member at each of its opposite ends. Between them, the shoulder members contain the filler strip and resilient member on the shank. One end of the shank is screw threaded and one of the shoulder members comprises a nut element engaging the screw thread while the other shoulder member is attached nonrotatably to the shank. Material selected for the resilient member is such that friction between its ends and the filler strip and the inner shoulder member is relatively high so that, after the fastener assembly is adjusted by means of the screw thread, to place an initial compression in the resilient member, the outer shoulder member (adjacent the inner surface of the filler strip) may be rotated while friction holds the inner shoulder and resilient members stationary and further compresses the resilient member. To secure the filler strip to the concave, with the strip in position, supported by the rods and with the resilient members extending radially outwards through the rods, the inner shoulder member is rotated sufficiently to cause further compression and distortion of the resilient member, preferably into a barrel shape, so that it grips the immediately adjacent concave rods. In a preferred embodiment, the filler strip assembly may comprise a flat elongated strip of rectangular cross section while the resilient member is of a hollow cylindrical form. The outer shoulder member is in the form of a nut molded into the resilient member with its bore coaxial with the bore of the resilient member. The resilient member may then be secured to the filler strip by a simple bolt or cap screw passing through a hole in the strip and engaging the nut molded into the resilient member.

BRIEF DESCRIPTION OF THE DRAWINGS

FIG. 1 is a simplified semi-schematic representation of a threshing cylinder and concave embodying the invention, and related components.

FIG. 2 is an enlarged partially sectioned view taken approximately on line 2—2 of FIG. 1 showing a filler strip assembly mounted in the concave with one of the retainer assemblies not yet tightened.

FIG. 3 is an enlarged partial view, taken on line 3—3 of FIG. 2 showing a filler strip in situ between the concave bars.

FIG. 4 is an enlarged partial view similar to FIG. 2 showing an alternative embodiment of the invention.

DESCRIPTION OF THE PREFERRED EMBODIMENT

The invention is embodied in a filler strip assembly for attachment to a generally conventional threshing concave shown with related components of a combine harvester in FIG. 1.

A feeder conveyor 10 (partially shown in FIG. 1) receives gathered crop material as the combine advances and feeds it to the threshold 12 of the threshing zone 14 between threshing cylinder 16 and concave 18. In normal operation, the threshing action between cylinder and concave results in the bulk of the threshed grain passing radially downwards and outwards through the concave 18 while straw and some still unseparated grain passes rearwardly assisted by the beater 20 onto straw walkers 22. Grain and other material passing through the concave is collected by conveyor 24 and carried to a cleaning shoe (not shown).

The construction of the concave 18 is conventional and consists essentially of a series of transverse or axial threshing bars 30 supported by side frame members 32. A series of parallel circumferentially extending rods 34 are threaded through the bars 30, inset somewhat below the inner edges 36 of the bars so that between each adjacent pair of bars, there is a shallow axially extending recess 38 with the rods 34 defining its floor and the bars 30 its walls.

The filler strip 40 is a simple flat strip of rectangular cross section with a series of spaced holes 42. Each hole 42 may receive a fastener assembly 44 which consists of a cap screw 46 threaded into a resilient anchor member 48 which has a resilient body 50, made for example, of a neoprene elastomer. The body 50 is in the form of a hollow cylinder with a thick wall 52 and an axial bore 54. The outer diameter of the body is slightly less than the spacing between adjacent concave rods 30. A threaded metal insert 56 (in this example, in the form of a hexagonal nut), coaxial with the bore 54 is molded into one end of the body 50. The inner end surface 58 of the threaded insert 56, cooperating with the outer surfaces 60 of the insert, constitute a shoulder engaging an outer end 61 of the body 50.

The cap screw 46 may be conventional in form including a shank 62 with a threaded portion 64 and a hexagonal head 66 having a shoulder face 68 which in assembly, bears on the inner surface 70 of the filler strip 40.

Before installation in the concave, a filler strip assembly 39 is made up by attaching fastener assemblies 44 in the condition shown in FIG. 3. They are tightened to compress the body inner end 71 against the outer surface 72 of the strip 40 so that friction there is sufficient in itself to permit further tightening of the fastener by manipulation of the head 66 alone but not sufficient to cause significant change of shape of the body 52. The filler strip assembly 39 is then laid in one of the recesses 38 of the concave with the fastener assemblies 44 extending radially outwards between concave rods 34 and the outer surface of the strip 72 seated on the rods. Further tightening of the cap screw 46 distorts the body 50 creating a bulge 74 engaging the rods 34 and clamping the filler strip into position.

Filler strip assemblies (39) according to the invention, are thus seen to be simple and potentially low in cost of manufacture. Two or three fastener assemblies (44), depending on the size of the combine, are sufficient to secure each strip (40) which may extend the full width of the threshing concave. Initial insertion and positioning of the filler strip assembly depends only on piloting the undistorted fastener assemblies between appropriate pairs of concave rods 34, a virtually foolproof operation. Once in position, the fasteners are easily manipulated by reaching into the threshing zone 14 and using a simple tool such as a common wrench. The resilient body (50) maintains sufficient tension on the cap screw 46 that the screw remains tight and also serves to dampen vibration thus inhibiting tendency of the cap screw to loosen compared with, say, an all metal fastener.

It will be recognized that in keeping with the invention, the filler strip itself may be modified for example, to be of channel form. Or other thicknesses or cross-sectional shapes may be offered to suit the threshing of particular crops. The fastener assembly may be modified also while retaining the important feature of the deformable resilient body. For example, rather than a metal nut insert molded into the body, an external flange nut 76 bearing on the outer end 78 of the resilient body 50' may be used as indicated in FIG. 4

I claim:

1. A filler strip assembly for a threshing concave of the type used in cooperation with a cylindrical threshing cylinder, the concave including a plurality of parallel rods extending circumferentially with respect to the threshing cylinder and cross-connected by a plurality of spaced apart parallel grate bars normal to the rods and parallel to the axis of the threshing cylinder and presenting threshing portions projecting above the rods and thus defining elongated axially extending recesses, the filler strip assembly being supportable by the rods in one of the recesses and partially filling said recess to limit the passage of crop material outwards through the concave and comprising:
   an elongated filler strip having an inner surface and an opposite generally parallel outer surface for being engaged by the rods and at least one through hole connecting said inner and outer surfaces; and
   a fastener assembly for attachment to the filler strip including;
   a shank for passing through the hole in the filler strip;
   an inner shoulder member carried by the shank for abutting the inner surface of the filler strip;
   a deformable body threadable onto the shank for abutting the outer surface of the filler strip;
   an outer shoulder member carried by the shank and having a shoulder face for abutting the deformable body member so that, in assembly, the body and the filler strip are contained between the respective opposed shoulder faces; and means responsive to manipulation of the inner shoulder member for biasing the shoulder members axially one towards the other, so that when the strip is placed in the recess with the outer surface of the strip adjacent the rods and the fastener assembly extending between a pair of neighboring rods, and the deformable body extending between a pair of adjacent rods, the inner shoulder member may be manipulated so that the deformable body becomes axially compressed and, responsive to such compression, expands to engage the adjacent rods so as to secure the filler strip assembly to the concave.

2. The filler strip assembly of claim 1 wherein the shank is screw threaded at one end and said screw threaded end is threadably engaged by one of said shoulder members.

3. The filler strip assembly of claim 2 wherein the inner shoulder member is fixed nonrotatably to the shank and the outer shoulder member comprises a screw threaded nut threadably engagable with the screw threaded end of the shank.

4. The filler strip assembly of claim 1 wherein the body member is generally cylindrical and includes an axial through bore and in assembly, the shank occupies said bore.

5. The filler strip assembly of claim 4 wherein the material of the body member is elastomeric.

* * * * *